Patented Mar. 7, 1944

2,343,625

UNITED STATES PATENT OFFICE 2,343,625

INSULIN PREPARATION AND METHOD OF MAKING SAME

Harold A. Abramson and Manuel H. Gorin, New York, N. Y., assignors of forty per cent to said Abramson, fifteen per cent to said Gorin, and forty-five per cent to Galen Company, a corporation of California No Drawing. Application January 13, 1941, Serial No. 374,210

11 Claims. (Cl. 167—75)

Our invention relates to an improved insulin preparation and more particularly to a preparation combining quick acting and prolonged acting insulin maintained in stable equilibrium, so that by the use of a single injection both a quick and a prolonged lowering of the blood sugar content may be obtained, together with a method of permanently stabilizing such a preparation within the range of stability of the pharmacological activity of insulin itself.

In order that our invention may be more fully understood, before detailed description thereof, we wish to outline certain definitions used herein.

Insulin in liquid media which is immediately available for use in the body is called herein "soluble" or "dissolved" insulin, inasmuch as insulin which quickly lowers the blood sugar content is soluble at physiological values of pH. "Insulin precipitate" means a prolonged acting insulin such as solid protamine insulin suspended in a liquid. Such protamine insulin is relatively insoluble at physiological values of pH, and therefore has a slow utilization and prolonged activity in the body. This precipitate, while ordinarily used as a suspension in liquid media, may settle on standing. Shaking, however, restores the proper distribution of particles. The term "insulin activity," as used herein, means the lowering of the blood sugar content which follows injection of any of these insulins in the animal body, irrespective of time of action, either immediate, prolonged, or both. By the term "equiliorium" we mean the condition of a preparation containing insulin of both the quick acting and prolonged acting types, whereby the physiological activity of the insulin constituents remains relatively unchanged for practical clinical purposes over long periods of time, and from results obtained thus far, the equilibrium appears to be of a permanent nature. The term "peptizing agent," as used herein, pertains to the type of substance commonly used to peptize proteins and includes acids, amino acids or other polar substances or their mixtures. In general these are highly polar substances, more polar than water. Such peptizing agents are best exemplified for example, by urea and glycine, although potassium thiocyanate as well as other salts may be employed. The term "stabilization," as used herein, means chemical stability and not bacterial or putrefactive stability, although such bacterial preservation may also be present as a result of the chemical stabilization produced.

Inasmuch as the physiological activity of dissolved insulin wears off rather quickly, usually in less than six hours after therapeutic injection, efforts have been made to produce a more prolonged insulin action. A prolonged insulin activity has been produced by the use of protamine insulins, as for example, protamine zinc insulin. Protamine insulins are precipitates relatively insoluble at physiological values of pH, therefore, when injected into the body, absorption thereof is slow. However, injections of prolonged acting insulins should be supplemented by injections of quick acting insulins of the soluble type in order to maintain a proper blood sugar balance. This has necessitated in the past, either dual injections, one for the quick acting insulin, and one for the prolonged acting insulin, or a single injection of a mixture made almost immediately prior to injection, such mixture being, however, difficult for the patient to control properly, and its action in the tissue is uncertain. Furthermore, dual injections are objectionable from the patient's point of view, and both procedures increase the possibility of infection.

In certain individuals, skin atrophy appears at the site of insulin injection. By decreasing, therefore, the number of injections, the number of these atrophic areas is correspondingly decreased.

Combinations of dissolved insulin and protamine insulin precipitates in liquid media are highly unstable at or near physiological values of pH, in that these mixtures continuously and quickly decrease in quick acting activity, and shortly after the combination has been made, the preparation has no practical clinical value other than that of the slow acting insulin precipitates which it contains.

Our invention has for its primary object, the formation and stabilization of a liquid mixture containing a combination of quick acting dissolved insulin with a prolonged acting insulin precipitate, such as the protamine insulins, which will remain relatively unchanged for practical clinical purposes, and which, therefore, when injected at varying times after compounding, can be relied upon to give both quick and prolonged insulin activity in the body.

Another object of our invention is to provide a stabilized combination of protamine insulins and dissolved insulin which will remain in equilibrium with each other so that a single injection can be given with predictable resultant activity.

Another object of our invention is to provide a method for making an insulin preparation having a stable equilibrium ratio of dissolved quick acting insulin to insulin precipitate, in which the ratio of the two insulins may be varied over a wide range, so that different dosages of quick acting insulin and prolonged acting insulin may be given, depending upon the needs of the patient.

It is another object of our invention to provide a means and method of maintaining dissolved insulin in equilibrium with suspended protamine insulin at or near pH 7.4, which is close to the pH of the blood stream and is a value of pH which lies in the zone of insolubility which makes it desirable for prolonged insulin action.

Another object of our invention is to produce stable combinations of insulins which can be used clinically without untoward reactions due to introduction of stabilizing substances or chemicals.

It is another object of our invention to provide a mixture of different types of insulin stabilized by the addition of a chemical stabilizing agent, physiologically harmless.

Still another object of our invention is to produce, from a suspended protamine insulin, a preparation having both quick acting and prolonged acting physiological insulin activity.

Broadly, we have found that if a peptizing agent, such as for example, urea or glycine, or both, is added to a medium containing a suspension of a protamine precipitate therein, a certain amount of the protamine insulin is converted into a soluble quick acting insulin, and that the addition of such peptizing agents maintains substantially permanent, for practical clinical purposes, an equilibrium ratio of soluble quick acting insulin to prolonged acting insulin with or without the initial addition of quick acting soluble insulin.

Our invention also comprises broadly, the stabilization of combinations of quick acting insulin and prolonged acting insulin by the use of peptizing agents, such combinations being stable over long periods for practical clinical purposes at or near the pH of the body fluids, or at other pH values. For example, if our preparations have their pH changed by the addition of acid or base, the peptizing agents still show their effect. Although the quantitive nature of the effect may be different, the principle of the process remains the same and our peptizing agents can be used independently of the pH with proper effect.

Another broad aspect of our invention is that, while the addition of peptizing agents to a relatively insoluble insulin precipitate, such as protamine zinc insulin, brings into the supernatant liquid a definite amount of quick acting dissolved insulin, it is possible to increase the amount of soluble insulin in the combination by adding to a suspension of protamine insulin an amount of dissolved soluble insulin, thus raising the ratio of soluble insulin to insulin precipitate. When this is done, the addition of peptizing agents creates an equilibrium holding in the supernatant liquid a greater amount of soluble insulin than would be produced by the action of the peptizing agent on the insulin precipitate alone. Consequently, by the use of peptizing agents as described herein, stable preparations can be made having any desired ratio of quick acting to prolonged acting insulin and at any desirable pH.

The following tabulation illustrates specific examples of conversion of a portion of an initial amount of protamine insulin into dissolved quick acting insulin by peptizing agents, the percentages of quick acting insulin resulting having been checked both chemically and clinically after stable equilibrium has occurred.

[Base: A commercial protamine zinc insulin suspension comprising 40 units of insulin per c. c. at pH 7.4.]

| Peptizing agent added | Substantially permanent equilibrium percentage of quick acting insulin in supernatant liquid |
|---|---|
| None | Clinically negligible at any time. |
| 30% urea | 17.5%. |
| 25% urea | 14.5%. |
| 15% glycine | 9%. |
| 16% urea 3% glycine | 16%. |
| 8% urea 3% glycine | 14%. |
| 15% urea 5% glycine | 17%. |

When the greater percentages of dissolved insulin are desired in the final product, soluble quick acting insulin may be initially added to the protamine insulin as shown below.

[Base: A commercial preparation containing 40 units per c. c. of protamine zinc insulin in suspension.]

| Peptizing agent added | Quick acting insulin added | Substantially permanent equilibrium percentage of quick acting insulin in supernatant liquid |
|---|---|---|
| None | 15 units per c. c. at pH 7.4. | Clinically negligible after two days. |
| 25% urea | 15 units per c. c. at pH 7.4. | 35%. |

A typical illustration of the combined stabilizing and peptizing action of agents like urea, may be found in the following example wherein eight grams of urea and four grams of water were heated to 100° in a water bath in rubber capped vials for 15 minutes. Under these conditions the urea dissolved and sterilization was achieved. To this urea plus water, after cooling, was added with sterile precautions, 15 c. c. of a standard preparation of quick acting dissolved insulin plus 25 c. c. of a standard preparation of zinc protamine insulin each of which contained 40 units of insulin per c. c. The urea was dissolved by gentle shaking and since the standard preparations were already sterile and contained phenol or other preservatives, the combined product was still sterile and contained a preservative. Prepared in this way, the total insulin activity was about 31 units per c. c. This preparation was assayed chemically and clinically. By chemical means it was found that from 25% to 35% of the total insulin was present in the supernatant liquid. Clinically, one injection of this preparation was compared with two separate injections, one of quick acting insulin and one of protamine zinc insulin given simultaneously in the ratio of 1:2 on the same diabetic patient and under the same conditions in the hospital. The two procedures, that is the one using our preparation and the one using two simultaneous injections, were found to give parallel results on the same patient. This was confirmed with other diabetic patients as well as by animal assay, and illustrates its clinical practicability. In this example our preparation ws prepared four months before clinical testing, and the physiological activity of the insulin constituents remained in substantial equilibrium.

By varying the quantity of the peptizing agent added and varying the initial ratios of dissolved insulin to protamine insulin, varying ratios of the two insulins may be obtained in stable equilibrium.

Using sterile technic, one method of preparing the above combinations is to add urea to the suspension of protamine insulin, or to a mixture of suspended protamine insulin and dissolved quick acting insulin, within a few minutes after the mixture has been made.

Another method is to dissolve the urea in sufficient liquid, such as for example, water, to bring the urea into solution at sterilizing temperatures, then adding the dissolved quick acting insulin, if used, and lastly adding the protamine suspension. Sterile technic is of course used also in this second method.

The stable equilibrium ratios of quick acting to prolonged acting insulins may then be determined for the preparations produced, by experimental trial thereof, or by prediction from experience, using known criteria.

It will be noted from the above tables that peptizing agents shift a portion of the protamine insulin precipitate into solution and keep it there, and in addition prevent the produced and added soluble insulins from shifting back into the precipitate phase during useful clinical life. A stable equilibrium between the two insulins can therefore be produced with wide ratio variations to meet different clinical dosage demands, without the necessity of mixing at time of injection, or dual injections, both of which procedures increase the probability of bacterial contamination.

Other pertinent facts may be noted from inspection of the above tables. There is demonstrated a synergistic activity between glycine and urea, in that mixtures of the two give better effects than either used separately. Also, the tables clearly show that dissolved insulin combined with suspensions of protamine agents are added. When such agents are added, however, according to our invention, equilibrium ratios can be obtained with stable percentages of quick acting soluble insulin present in amounts as desired for clinical use.

The preferred peptizing agents, urea and glycine, have been carefully tested clinically for irritability or toxicity, and the presence of such agents has not been found to be in any manner detrimental. Other peptizing agents including potassium thiocyanate as well as other salts, while non-toxic, are slightly irritable but not to the extent as to render the same impracticable.

The action of a mixture of urea and glycine is quite different from that of either alone. One of the differences, beyond that of maintaining an equilibrium, is that the precipitate in our stabilized product, where mixtures of urea and glycine are employed and synergistic action of the two is observable, appears to settle more quickly and occupies less volume. Grossly, it appears to be granular in nature. Microscopically it may be seen that part of the precipitate and in some examples most of the precipitate is crystalline in nature. A preliminary physiological and chemical analysis of these new crystals has led us to the present conclusion that they are crystalline compounds of protamine insulin formed by the addition of the peptizing agents, but their exact composition is not at present known to us. However, chemical and clinical evidence has completely demonstrated the stable retention of dissolved quick acting insulin in the combinations set forth above and in many other ratios not given here.

It should be understood that in the preservation of the mixture of our invention, suitable preservatives, such as phenol or cresol, may be employed, preferably in the proportion of 1% thereof by volume.

Furthermore, our invention is not alone applicable to protamine insulins. Thus, in suspensions of globin insulins and others of that type, we have demonstrated that peptizing agents have the same stabilizing effects as outlined above for protamine insulin.

If it is desirable to obtain the constituents of our preparation in dry solid form, this may be accomplished in any well known manner by high vacuum distillation or sublimation at low temperatures, for instance by the lyophile process of drying. In effecting drying, however, temperature is an important consideration and must be maintained low enough so that the potency of the various constituents will not be destroyed or damaged. In reducing the preparation of our invention to a dry solid form, the liquid mixture may be reduced or the several constituents thereof may be dried separately and then mixed in proper ratios in their dry state so that when combined with a liquid under sterile conditions at the time of use or distribution will provide the recommended clinical preparation.

While a specific embodiment of the invention has been set forth for purposes of illustration, it will be understood that various changes and modifications may be made therein and that the invention is capable of various uses, as will be apparent to a person skilled in the art. The invention is, accordingly, to be limited only in accordance with the following claims when interpreted in view of the prior art.

We claim:

1. A liquid insulin preparation comprising dissolved insulin and insulin precipitate, stabilized by a protein peptizing agent substantially non-toxic to the human system.

2. A liquid insulin preparation comprising dissolved insulin and insulin precipitate, stabilized by urea.

3. A liquid insulin preparation comprising dissolved insulin and insulin precipitate, stabilized by glycine.

4. A liquid insulin preparation comprising dissolved insulin and insulin precipitate, stabilized by a combination of urea and glycine.

5. The method of stabilizing a liquid containing a combination of dissolved insulin and insulin precipitate, which comprises the step of adding thereto a protein peptizing agent substantially non-toxic to the human system.

6. The method of stabilizing a liquid containing dissolved insulin and insulin precipitate, which comprises the step of adding urea to said liquid.

7. The method of stabilizing a liquid containing dissolved insulin and insulin precipitate, which comprises the step of adding glycine to said liquid.

8. The method of stabilizing a liquid containing dissolved insulin and insulin precipitate, which comprises the step of adding urea and glycine to said liquid.

9. The method of forming a stable liquid containing insulin, which comprises combining an insulin precipitate with a solution of dissolved insulin, and adding a protein peptizing agent substantially non-toxic to the human system to the combined insulins substantially at the time of combination.

10. The method of forming a stable liquid containing insulin, which comprises combining an insulin precipitate with a solution of dissolved insulin, and adding urea and glycine to the combined insulins substantially at the time of combination.

11. The method of forming liquid having a substantially stable ratio of dissolved insulin and slow acting insulin, which comprises adding a substantially non-toxic protein peptizing agent to an insulin precipitate in a liquid to change a portion of said insulin precipitate to substantially a stable portion of dissolved insulin.

HAROLD A. ABRAMSON.
MANUEL H. GORIN.